(12) United States Patent
Dienst et al.

(10) Patent No.: US 10,117,377 B2
(45) Date of Patent: *Nov. 6, 2018

(54) WHEEL POSITION CONTROL SYSTEM FOR AN AGRICULTURAL IMPLEMENT

(71) Applicant: CNH Industrial America LLC, New Holland, PA (US)

(72) Inventors: Johnathon R. Dienst, Dekalb, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/213,003

(22) Filed: Jul. 18, 2016

(65) Prior Publication Data

US 2018/0014450 A1 Jan. 18, 2018

(51) Int. Cl.
| | |
|---|---|
| *A01C 7/20* | (2006.01) |
| *A01B 63/22* | (2006.01) |
| *A01B 63/24* | (2006.01) |
| *A01C 21/00* | (2006.01) |
| *A01C 7/00* | (2006.01) |

(52) U.S. Cl.
CPC ............ *A01C 21/002* (2013.01); *A01B 63/22* (2013.01); *A01C 7/00* (2013.01)

(58) Field of Classification Search
CPC .................................. A01B 63/16; A01C 7/00
See application file for complete search history.

(56) References Cited

U.S. PATENT DOCUMENTS

| 3,584,691 A | 6/1971 | Reynolds |
| 4,346,763 A | 8/1982 | Swanson et al. |

(Continued)

FOREIGN PATENT DOCUMENTS

| WO | 2012125109 | 9/2012 |
| WO | 2013112929 | 8/2013 |

OTHER PUBLICATIONS

Hemmat, A., & Adamchuk, V. I. (2008). Sensor systems for measuring soil compaction: Review and analysis. Computers and electronics in agriculture, 63(2), 89-103. (Year: 2008).*

(Continued)

*Primary Examiner* — Alan D Hutchinson
(74) *Attorney, Agent, or Firm* — Rebecca L. Henkel; Rickard K. DeMille

(57) ABSTRACT

An agricultural implement system includes a wheel position control system configured to control respective positions of an aligned wheel and an offset wheel of the agricultural implement system. The aligned wheel is configured to be substantially laterally aligned with a corresponding vehicle wheel/track, and the offset wheel is configured to be laterally offset from the corresponding vehicle wheel/track. The wheel position control system is configured to instruct lowering of the aligned wheel and the offset wheel to transition a toolbar assembly to a non-working position, the wheel position control system is configured to instruct raising of the aligned and offset wheels to transition the toolbar assembly to a working position, and the wheel position control system is configured to instruct raising of the offset wheel above the aligned wheel while the toolbar assembly is in the working position such that the offset wheel is disengaged from the soil surface.

20 Claims, 5 Drawing Sheets

(56) References Cited

U.S. PATENT DOCUMENTS

| | | | |
|---|---|---|---|
| 4,427,207 A | 1/1984 | Gafford | |
| 4,519,460 A | 5/1985 | Gust | |
| 4,927,165 A | 5/1990 | Murray | |
| 5,031,550 A | 7/1991 | Neal | |
| 5,685,245 A | 11/1997 | Bassett | |
| 6,408,950 B1 * | 6/2002 | Shoup | A01B 73/065 111/57 |
| 7,021,720 B1 | 4/2006 | Yeggy | |
| 8,141,652 B2 | 3/2012 | Poole et al. | |
| 9,301,439 B2 * | 4/2016 | Gilstring | A01B 49/027 |
| 9,651,536 B1 * | 5/2017 | Lund | G01N 33/24 |
| 2006/0090910 A1 | 5/2006 | Houck | |
| 2008/0053351 A1 | 3/2008 | Bettin | |
| 2011/0284252 A1 | 11/2011 | Friggstad et al. | |
| 2012/0032005 A1 | 2/2012 | McMahon et al. | |
| 2012/0261145 A1 | 10/2012 | Palen | |
| 2014/0303854 A1 * | 10/2014 | Zielke | A01C 21/00 701/50 |

OTHER PUBLICATIONS http://www.kinze.com/filesimages/Literature/4900.pdf, Kinze 4900 Planter, Kinze Manufacturing, Inc., pp. 1-36, accessed May 26, 2015.

U.S. Appl. No. 14/796,841, filed Jul. 10, 2015, Johnathon R. Dienst.

* cited by examiner

WHEEL POSITION CONTROL SYSTEM FOR AN AGRICULTURAL IMPLEMENT

BACKGROUND

The disclosure relates generally to a wheel position control system for an agricultural implement.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds.

In certain seeding implements, the row units are mounted along a toolbar assembly. Certain toolbar assemblies are supported by multiple ground engaging wheels (e.g., positioned at a central portion of the toolbar assembly and at distal ends of the toolbar assembly). The ground engaging wheels may be configured to support the toolbar assembly while the toolbar assembly is in a lowered/working position and in a raised/non-working position (e.g., for turning at a headland). Certain toolbar assemblies include two pairs of ground engaging wheels positioned at the central portion of the toolbar assembly. The two pairs of wheels may include an inner pair of wheels positioned proximate to a centerline of the implement and an outer pair of wheels positioned laterally outward from the inner pair of wheels. In certain implements, the outer pair of wheels may be substantially aligned with wheels and/or tracks of a tow vehicle (e.g., tractor). As a result, the outer pair of wheels may not substantially contribute to soil compaction (e.g., the outer pair of wheels may not substantially increase the compaction of soil that has been compacted by the tow vehicle wheels and/or tracks). However, because the inner pair of wheels is positioned laterally inward from the wheels and/or tracks of the tow vehicle, the inner pair of wheels may compact the soil as the implement is towed through a field. As a result of the compaction, crop yields from seeds planted proximate to the inner pair of wheels may be reduced, thereby decreasing the efficiency of the seeding process

BRIEF DESCRIPTION

In one embodiment, an agricultural implement system includes a toolbar assembly configured to support at least one row unit. In addition, the agricultural implement system includes multiple wheels configured to support the toolbar assembly above a soil surface. The wheels include an aligned wheel and an offset wheel, a centerline of the aligned wheel is configured to be substantially laterally aligned with a centerline of a corresponding wheel or track of a tow vehicle, a centerline of the offset wheel is configured to be laterally offset from the centerline of the corresponding wheel or track of the tow vehicle, and the tow vehicle is configured to tow the agricultural implement system. The agricultural implement system also includes a wheel position control system configured to control movement of each wheel relative to the toolbar assembly. The wheel position control system is configured to instruct an aligned actuator and an offset actuator to lower the aligned wheel and the offset wheel, respectively, relative to the toolbar assembly to transition the toolbar assembly to a non-working position, in which the aligned and offset wheels engage the soil surface and the at least one row unit is disengaged from the soil surface, the wheel position control system is configured to instruct the aligned actuator and the offset actuator to raise the aligned wheel and the offset wheel, respectively, relative to the toolbar assembly to transition the toolbar assembly to a working position, in which the aligned wheel engages the soil surface and the at least one row unit engages the soil surface, and the wheel position control system is configured to instruct the offset actuator to raise the offset wheel above the aligned wheel relative to the toolbar assembly while the toolbar assembly is in the working position such that the offset wheel is disengaged from the soil surface.

In another embodiment, an agricultural implement system includes a wheel position control system configured to control respective positions of an aligned wheel and an offset wheel of the agricultural implement system. A centerline of the aligned wheel is configured to be substantially laterally aligned with a centerline of a corresponding wheel or track of a tow vehicle, a centerline of the offset wheel is configured to be laterally offset from the centerline of the corresponding wheel or track of the tow vehicle, the aligned and offset wheels are configured to support a toolbar assembly, the toolbar assembly is configured to support at least one row unit, and the tow vehicle is configured to tow the agricultural implement system. The wheel position control system includes an electronic controller configured to instruct an aligned actuator and an offset actuator to lower the aligned wheel and the offset wheel, respectively, to transition the toolbar assembly to a non-working position, in which the aligned and offset wheels engage a soil surface and the at least one row unit is disengaged from the soil surface, the electronic controller is configured to instruct the aligned and offset actuators to raise the aligned and offset wheels, respectively, to transition the toolbar assembly to a working position, in which the aligned wheel engages the soil surface and the at least one row unit engages the soil surface, and the electronic controller is configured to instruct the offset actuator to raise the offset wheel above the aligned wheel while the toolbar assembly is in the working position such that the offset wheel is disengaged from the soil surface.

In a further embodiment, an agricultural implement system includes a toolbar assembly configured to support at least one row unit. The agricultural implement system also includes an aligned wheel configured to support the toolbar assembly above a soil surface, and an aligned wheel frame rotatably coupled to the toolbar assembly and configured to support the aligned wheel. The aligned wheel frame is positioned to laterally align a centerline of the aligned wheel with a centerline of a corresponding wheel or track of a tow vehicle while the tow vehicle is coupled to the agricultural implement system, and the tow vehicle is configured to tow the agricultural implement system. In addition, the agricultural implement system includes an aligned actuator configured to adjust a first angle of the aligned wheel frame relative to the toolbar assembly. The agricultural implement system further includes an offset wheel configured to support the toolbar assembly above the soil surface, and an offset wheel frame rotatably coupled to the toolbar assembly and configured to support the offset wheel. The offset wheel frame is positioned to laterally offset a centerline of the offset wheel from the centerline of the corresponding wheel or track of the tow vehicle while the tow vehicle is coupled to the agricultural implement system. Furthermore, the agricultural implement system includes an offset actuator configured to adjust a second angle of the offset wheel frame relative to the toolbar assembly. The agricultural implement system also includes a wheel position control system having an electronic controller. The electronic controller is configured to instruct the aligned actuator and the offset actuator to lower the aligned wheel and the offset wheel, respectively, relative to the toolbar assembly to transition the toolbar assembly to a non-working position, in which the aligned and offset wheels engage the soil surface and the at least one row unit is disengaged from the soil surface, the electronic controller is configured to instruct the aligned and offset actuators to raise the aligned and offset wheels, respectively, relative to the toolbar assembly to transition the toolbar assembly to a working position, in which the aligned wheel engages the soil surface and the at least one row unit engages the soil surface, and the electronic controller is configured to instruct the offset actuator to raise the offset wheel above the aligned wheel while the toolbar assembly is in the working position such that the offset wheel is disengaged from the soil surface.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
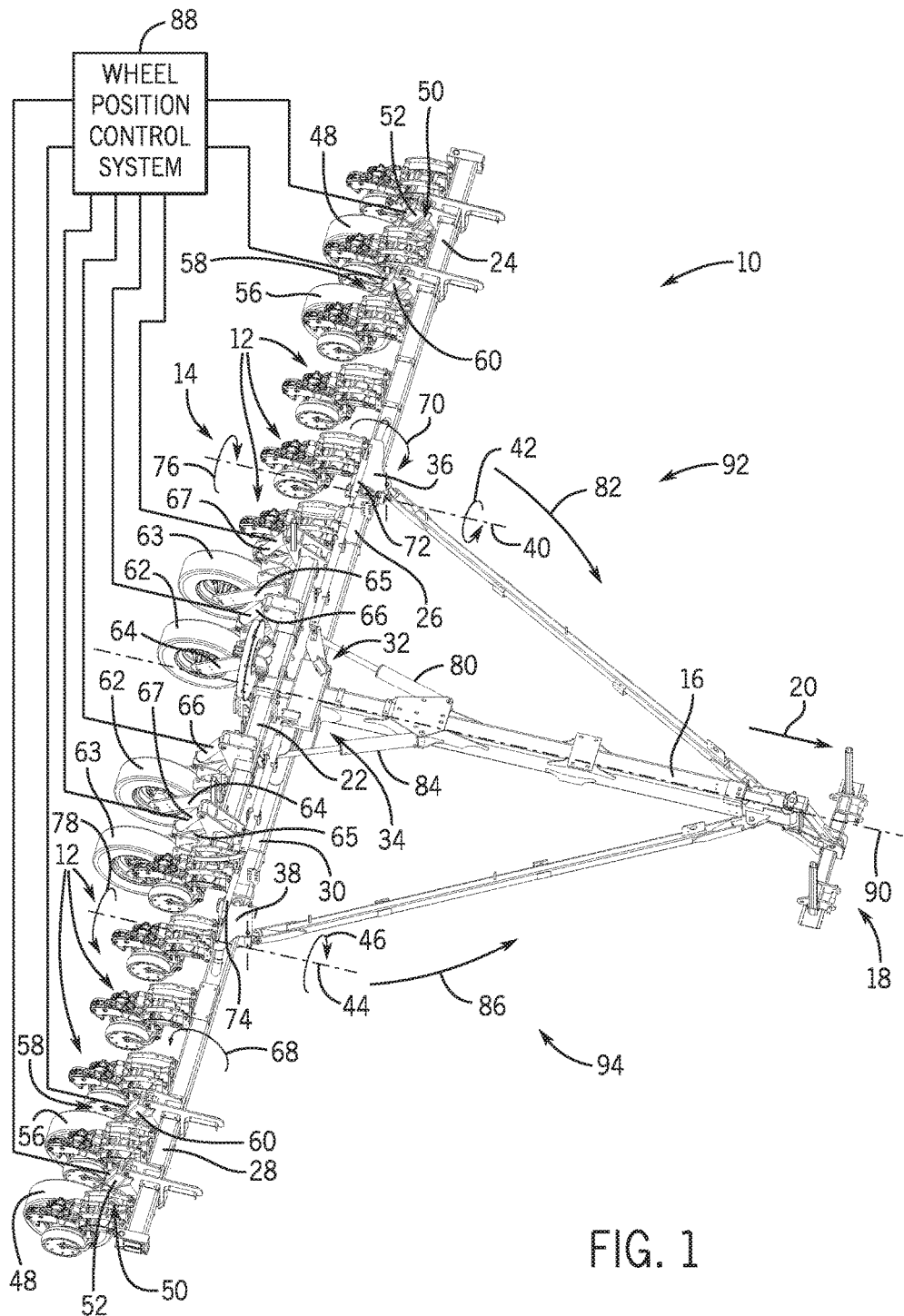
FIG. 1 is a perspective view of an embodiment of an agricultural implement system configured to deposit seeds into soil.

Turning now to the drawings, FIG. 1 is a perspective view of an embodiment of an agricultural implement system 10 configured to deposit seeds into soil. In the illustrated embodiment, the agricultural implement system 10 includes row units 12 configured to open the soil, dispense seeds into the soil opening, and re-close the soil as the agricultural implement system 10 moves through a field. For example, in certain embodiments, each row unit 12 includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds. While the agricultural implement system 10 is configured to include sixteen row units 12 in the illustrated embodiment (only twelve row units 12 are shown for clarity), it should be appreciated that in alternative embodiments, the agricultural implement system may include more or fewer row units. For example, in certain embodiments, the agricultural implement system may include 6, 8, 10, 12, 14, 15, 16, 18, 20, 22, 23, 24, or more row units.

As illustrated, the row units 12 are coupled to a toolbar assembly 14. The toolbar assembly 14, in turn, is coupled to a tow bar assembly 16, which includes a hitch assembly 18. The hitch assembly 18 is configured to couple the agricultural implement system 10 to a tow vehicle, such as a tractor or other work vehicle. Accordingly, the tow vehicle may move the agricultural implement system 10 across a field in a direction of travel 20. As discussed in detail below, the tow bar assembly 16 is configured to elongate as wings of the toolbar assembly 14 rotate from the illustrated working position toward a transport position.

In the illustrated embodiment, the toolbar assembly 14 includes a central toolbar 22, a first wing toolbar 24, a first wing support 26, a second wing toolbar 28, and a second wing support 30. The central toolbar 22 is rigidly coupled to the tow bar assembly 16, and the central toolbar 22 is configured to support four row units 12. However, it should be appreciated that the central toolbar may be configured to support more or fewer row units in alternative embodiments. The first and second wing supports 26 and 30 are pivotally coupled to the tow bar assembly 16 by first and second pivot joints 32 and 34, respectively. As discussed in detail below, the first and second pivot joints 32 and 34 enable the wing toolbars and the wing supports to rotate forwardly from the illustrated working position to a transport position. In the illustrated embodiment, one row unit 12 is coupled to each wing support. However, it should be appreciated that in alternative embodiments, more or fewer row units (e.g., 0, 1, 2, 3, 4, or more) may be coupled to each wing support. The first wing toolbar 24 is pivotally coupled to the first wing support 26 by a third pivot joint 36, and the second wing toolbar 28 is pivotally coupled to the second wing support 30 by a fourth pivot joint 38. The third and fourth pivot joints 36 and 38 enable the toolbar assembly 14 to bend in response to variations in the surface of the soil. In the illustrated embodiment, five row units 12 are coupled to each wing toolbar. However, it should be appreciated that more or fewer row units (e.g., 1, 2, 3, 4, 5, 6, 8, 10, or more) may be coupled to each wing toolbar in alternative embodiments.

While the toolbar assembly 14 is in the illustrated lowered/working position and the wing toolbars are in the illustrated working position, the row units 12 (e.g., ground-engaging elements of the row units, such as gauge wheels, openers, closing discs, packer wheels, etc.) are configured to engage the soil, thereby facilitating planting/seeding operations. In the illustrated embodiment, the toolbar assembly 14 is configured to bend at the third and fourth pivot joints 36 and 38 in response to variations in the surface of the soil. Accordingly, the row units 12 may maintain engagement with the soil as the agricultural implement system 10 encounters varying contours within the field. In the illustrated embodiment, the first wing toolbar 24 is configured to rotate about a first wing axis 40 relative to the first wing support 26 to enable a portion of the toolbar assembly 14 (e.g., left half of the toolbar assembly 14) to bend in response to variations in the surface of the soil. For example, if row units coupled to the first wing toolbar 24 encounter terrain that is elevated relative to the terrain under the central toolbar 22 and/or under the first wing support 26, the first wing toolbar 24 may rotate in a direction 42 about the axis 40. As a result, the row units 12 coupled to the central toolbar 22, the first wing support 26, and the first wing toolbar 24 may maintain engagement with the soil surface.

In addition, the second wing toolbar 28 is configured to rotate about a second wing axis 44 relative to the second wing support 30 to enable a portion of the toolbar assembly 14 (e.g., right half of the toolbar assembly 14) to bend in response to variations in the surface of the soil. For example, if row units coupled to the second wing toolbar 28 encounter terrain that is elevated relative to the terrain under the central toolbar 22 and/or under the second wing support 30, the second wing toolbar 28 may rotate in a direction 46 about the axis 44. As a result, the row units 12 coupled to the central toolbar 22, the second wing support 30, and the second wing toolbar 28 may maintain engagement with the soil surface. In the illustrated embodiment, the first and second wing axes 40 and 44 are substantially parallel to the direction of travel 20. However, it should be appreciated that in alternative embodiments, the first and second wing axes may be angled relative to the direction of travel (e.g., based on the configuration of the third and fourth pivot joints).

In the illustrated embodiment, the agricultural implement system 10 includes first wheels 48 configured to support the toolbar assembly 14 above the soil surface. One first wheel 48 is coupled to the first wing toolbar 24 by a respective first wheel frame 50, and another first wheel 48 is coupled to the second wing toolbar 28 by a respective first wheel frame 50. Each first wheel frame 50 is rotatably coupled to the respective wing toolbar and rotatably coupled to the respective first wheel 48. A wheel actuator 52, such as a hydraulic actuator or a hydraulic cylinder, among others, is coupled to each first wheel frame 50 and to the respective wing toolbar (e.g., via a bracket). The wheel actuators 52 are configured to rotate the first wheel frames 50 relative to the respective wing toolbars.

Furthermore, the illustrated agricultural implement system 10 includes second wheels 56 configured to support the toolbar assembly 14 above the soil surface. One second wheel 56 is coupled to the first wing toolbar 24 by a respective second wheel frame 58, and another second wheel 56 is coupled to the second wing toolbar 28 by a respective second wheel frame 58. Each second wheel frame 58 is rotatably coupled to the respective wing toolbar and rotatably coupled to the respective second wheel 56. A wheel actuator 60, such as a hydraulic actuator or a hydraulic cylinder, among others, is coupled to each second wheel frame 58 and to the respective wing toolbar (e.g., via a bracket). The wheel actuators 60 are configured to rotate the second wheel frames 58 relative to the respective wing toolbars.

In the illustrated embodiment, only one row unit 12 is disposed between the first wheel 48 and the second wheel 56 of the first wing toolbar 24, and only one row unit 12 is disposed between the first wheel 48 and the second wheel 56 of the second wing toolbar 28. However, it should be appreciated that in alternative embodiments, more row units (e.g., 2, 3, 4, or more) may be disposed between the first wheel 48 and the second wheel 56 (e.g., on the first wing toolbar and/or on the second wing toolbar). Furthermore, while each wing toolbar is supported by two wheels in the illustrated embodiment, it should be appreciated that in alternative embodiments, each wing toolbar may be supported by more or fewer wheels (e.g., 1, 2, 3, 4, 5, or more).

In the illustrated embodiment, the agricultural implement system 10 also includes two third wheels 62 coupled to the central toolbar 22 by respective third wheel frames 64, and two fourth wheels 63 coupled to the central toolbar 22 by respective fourth wheel frames 65. The third wheel frames 64 are rotatably coupled to the central toolbar 22 and rotatably coupled to the third wheels 62, and the fourth wheel frames 65 are rotatably coupled to the central toolbar 22 and rotatably coupled to the fourth wheels 63. A third wheel actuator 66, such as a hydraulic actuator or a hydraulic cylinder, among others, is coupled to each third wheel frame 64 and to the central toolbar 22 (e.g., via a bracket). The third wheel actuators 66 are configured to rotate the third wheel frames 64 relative to the central toolbar 22. In addition, a fourth wheel actuator 67, such as a hydraulic actuator or a hydraulic cylinder, among others, is coupled to each fourth wheel frame 65 and to the central toolbar 22 (e.g., via a bracket). The fourth wheel actuators 67 are configured to rotate the fourth wheel frames 65 relative to the central toolbar 22.

By way of example, with the toolbar assembly 14 in the illustrated lowered/working position, the wheel actuators 52, 60, 66, and 67 may rotate the wheel frames 50, 58, 64, and 65 in the direction 68 (e.g., via extension of hydraulic cylinders), thereby moving the toolbar assembly 14 to a raised/non-working position. Furthermore, with the toolbar assembly 14 in the raised/non-working position, the wheel actuators 52, 60, 66, and 67 may rotate the wheel frames 50, 58, 64, and 65 in the direction 70 (e.g., via retraction of hydraulic cylinders), thereby moving the toolbar assembly 14 to the lowered/working position. With the toolbar assembly 14 in the lowered/working position, the row units 12 (e.g., ground-engaging elements of the row units, such as gauge wheels, openers, closing discs, packer wheels, etc.) may engage the soil. In addition, transitioning the toolbar assembly 14 to the raised/non-working position causes the row units 12 to disengage the soil. The toolbar assembly 14 may be transitioned to the raised position for turning the agricultural implement system 10 at a headland, or as discussed in detail below, for transitioning the wing toolbars to a transport position.

In the illustrated embodiment, the agricultural implement system 10 includes a first wing actuator 72, such as a hydraulic actuator or a hydraulic cylinder, among others, extending between the first wing support 26 and the first wing toolbar 24. In addition, the agricultural implement system 10 includes a second wing actuator 74, such as a hydraulic actuator or a hydraulic cylinder, among others, extending between the second wing support 30 and the second wing toolbar 28. In certain embodiments and/or operating conditions, the first and second wing actuators 72 and 74 may be transitioned to a float mode while the toolbar assembly 14 is in the lowered/working position, thereby enabling the wing toolbars to rotate in response to variations in the terrain. However, in alternative embodiments and/or operating conditions, the first and second wing actuators 72 and 74 may urge the respective wing toolbars downwardly while the toolbar assembly 14 is in the lowered/working position. For example, the first wing actuator 72 may urge the first wing toolbar 24 to rotate in a direction 76 about the first wing axis 40, thereby urging the row units coupled to the first wing toolbar 24 toward the soil surface. In addition, the second wing actuator 74 may urge the second wing toolbar 28 to rotate in a direction 78 about the second wing axis 44, thereby urging the row units coupled to the second wing toolbar 28 toward the soil surface. By way of example, while the agricultural implement system 10 is being operated in certain soil conditions (e.g., soft soil), the first and second wing actuators 72 and 74 may be transitioned to the float mode, and while the agricultural implement system 10 is being operated in other soil conditions (e.g., hard soil), the first and second wing actuators 72 and 74 may urge the first and second wing toolbars downwardly.

As previously discussed, the first and second wing toolbars 24 and 28, and the first and second wing supports 26 and 30 are configured to rotate between the illustrated working position and a transport position. As illustrated, with the wing toolbars and wing supports in the illustrated working position, the first wing toolbar 24, the first wing support 26, the second wing toolbar 28, and the second wing support 30 are substantially perpendicular to the direction of travel 20. As disclosed herein, "substantially perpendicular" refers to an arrangement in which the wing toolbar and wing support are angled about 45 degrees to about 135 degrees, about 55 degrees to about 125 degrees, about 65 degrees to about 115 degrees, about 75 degrees to about 105 degrees, about 85 degrees to about 95 degrees, or about 90 degrees relative to the direction of travel 20. In the illustrated embodiment, the agricultural implement system 10 includes a first wing support actuator 80, such as a hydraulic actuator or hydraulic cylinder, among others, extending between the tow bar assembly 16 and the first wing support 26. The first wing support actuator 80 is configured to rotate the first wing support 26 and the first wing toolbar 24 forwardly in a direction 82 about the first pivot joint 32 (e.g., via retraction of a hydraulic cylinder). In addition, the agricultural implement system 10 includes a second wing support actuator 84, such as a hydraulic actuator or hydraulic cylinder, among others, extending between the tow bar assembly 16 and the second wing support 30. The second wing support actuator 84 is configured to rotate the second wing support 30 and the second wing toolbar 28 forwardly in a direction 86 about the second pivot joint 34 (e.g., via retraction of a hydraulic cylinder).

By way of example, to transition the first wing toolbar 24, the first wing support 26, the second wing toolbar 28, and the second wing support 30 to the transport position, the wheel actuators 52, 60, 66, and 67 move the toolbar assembly 14 to the raised/non-working position, thereby disengaging the row units from the soil. The wing support actuators 80 and 84 then rotate the first wing toolbar 24, the first wing support 26, the second wing toolbar 28, and the second wing support 30 forwardly to the transport position. As the wing toolbars and the wing supports rotate forwardly, the tow bar 16 elongates to accommodate the length of the wing toolbars and the wing supports. Furthermore, to transition the first wing toolbar 24, the first wing support 26, the second wing toolbar 28, and the second wing support 30 to the working position, the wing support actuators 80 and 84 rotate the first and second wing toolbars and the first and second wing supports rearwardly to the working position. The wheel actuators 52, 60, 66, and 67 then move the toolbar assembly 14 to the lowered/working position, thereby driving the row units to engage the soil.

In the illustrated embodiment, the agricultural implement system 10 includes a wheel position control system 88 configured to control movement of the first wheels 48, the second wheels 56, the third wheels 62, and the fourth wheels 63 relative to the toolbar assembly 14. For example, the wheel position control system 88 may instruct the first actuators 52, the second actuators 60, the third actuators 66, and the fourth actuators 67 to lower the first, second, third, and fourth wheels 48, 56, 62, and 63 relative to the toolbar assembly 14 (e.g., via rotation of the first wheel frames 50, the second wheel frames 58, the third wheel frames 64, and the fourth wheel frames 65 in the direction 68), thereby moving the toolbar assembly 14 to the non-working position. With the toolbar assembly 14 in the non-working position, the first, second, third, and fourth wheels 48, 56, 62, and 63 engage the soil surface, and the row units 12 are disengaged from the soil surface. In addition, the wheel position control system 88 may instruct the first, second, third, and fourth actuators 52, 60, 66, and 67 to raise the first, second, third, and fourth wheels 48, 56, 62, and 63 (e.g., via rotation of the first wheel frames 50, the second wheel frames 58, the third wheel frames 64, and the fourth wheel frames 65 in the direction 70), thereby moving the toolbar assembly 14 to the working position. The wheel position control system 88 may also instruct the third actuators 66 to raise the third wheels 62 above the fourth wheels 63 relative to the toolbar assembly 14 (e.g., via rotation of the third wheel frames 64 in the direction 70) while the toolbar assembly 14 is in the working position, such that the third wheels 62 are disengaged from the soil surface. Accordingly, with the toolbar assembly 14 in the working position, the row units 12, the first wheels 48, the second wheels 56, and the fourth wheels 63 engage the soil surface.

In certain implements, the fourth wheels 63 may be substantially aligned with wheels and/or tracks of a tow vehicle (e.g., tractor). As a result, the fourth wheels 63 may not substantially contribute to soil compaction (e.g., the fourth wheels 63 may not substantially increase the compaction of soil that has been compacted by the tow vehicle wheels and/or tracks). Moreover, because the wheel position control system 88 is configured to instruct the third actuators 66 to raise the third wheels 62 off the ground while the toolbar assembly 14 is in the working position, soil compaction beneath the third wheels 62 may be substantially reduced or eliminated. Accordingly, the crop yield from seeds planted by row units positioned proximate to the third wheels 62 may be increased. As a result, the overall seeding efficiency of the agricultural implement system may be enhanced.

In certain embodiments, the agricultural implement system 10 includes one or more sensors configured to output a signal indicative of soil softness. In such embodiments, the wheel position control system 88 is configured to selectively instruct the third actuators 66 to lower the third wheels 62 into engagement with the soil surface while the toolbar assembly 14 is in the lowered/working position and a soil softness exceeds a soil softness threshold value. As a result, the possibility of the first wheels 48, the second wheels 56, the fourth wheels 63, and the row units 12 sinking into soft soil may be substantially reduced. Furthermore, the wheel position control system 88 may be configured to instruct the third actuators 66 to control a down force on the third wheels 62 based at least in part on the soil softness while the soil softness exceeds the soil softness threshold value. Accordingly, the third wheels 62 may apply a force to the soil surface sufficient to reduce the possibility of the first wheels 48, the second wheels 56, the fourth wheels 63, and the row units 12 sinking into the soil, while substantially reducing soil compaction beneath the third wheels 62.

In the illustrated embodiment, each third wheel 62 and third wheel frame 64 is positioned closer to a centerline 90 of the agricultural implement system 10 than the adjacent fourth wheel 63 and fourth wheel frame 65. As illustrated, the centerline 90 extends along the direction of travel 20 between a left lateral portion 92 and a right lateral portion 94 of the agricultural implement system 10. Accordingly, the wheel position control system 88 is configured to raise the laterally inward wheels of the central toolbar 22. However, it should be appreciated that in alternative embodiments, the wheel position control system 88 may be configured to raise the laterally outward wheels of the central toolbar. For example, in certain embodiments, the laterally inward wheels of the central toolbar may be substantially aligned with the wheels and/or tracks of the tow vehicle. In such embodiments, the third wheels (e.g., the wheels configured to be raised by the wheel position control system while the toolbar assembly is in the working position) may be positioned farther from the centerline 90 than the fourth wheels.

While the illustrated embodiment includes two wing toolbars, i.e., the first wing toolbar 24 and the second wing toolbar 28, it should be appreciated that in alternative embodiments, the toolbar assembly 14 may include additional wing toolbars. For example, in certain embodiments, the toolbar assembly 14 may include 2, 4, 6, 8, or more wing toolbars. In addition, while hydraulic actuators (e.g., hydraulic cylinders) are disclosed herein, it should be appreciated that the wheel actuators 52, 60, 66, and 67, the first and second wing actuators 72 and 74, and the wing support actuators 80 and 84 may include pneumatic actuators (e.g., pneumatic cylinders, pneumatic motors, etc.), electric actuators (e.g., solenoids, electric motors, etc.), or any other suitable actuator in alternative embodiments.

Figure 2:
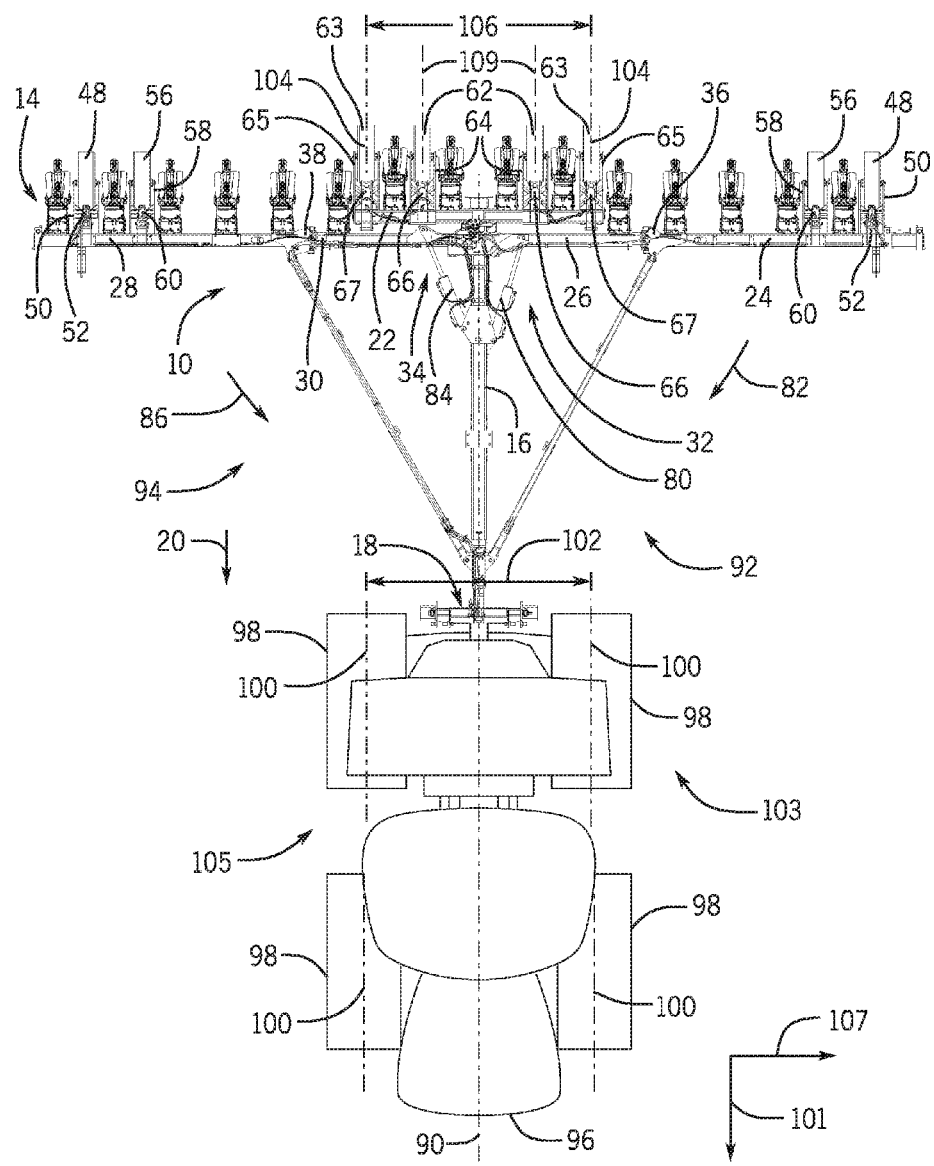
FIG. 2 is a top view of the agricultural implement system of FIG. 1 and an embodiment of a work vehicle configured to tow the agricultural implement system.

FIG. 2 is a top view of the agricultural implement system 10 of FIG. 1 and an embodiment of a work vehicle 96 configured to tow the agricultural implement system 10. As illustrated, the work vehicle 96 includes tracks 98 having centerlines 100 (e.g., extending along a longitudinal axis 101 in the direction of travel 20). The centerlines 100 of the left tracks 98 (e.g., the tracks 98 on the left side 103 of the work vehicle 96) are aligned with one another, and the centerlines 100 of the right tracks 98 (e.g., the tracks 98 on the right side 105 of the work vehicle 96) are aligned with one another. In addition, the centerlines 100 of the left tracks 98 are spaced apart from the centerlines 100 of the right tracks 98 by a distance 102 along a lateral axis 107. The distance 102 may be selected based on a desired crop row spacing, such that the tracks 98 are positioned between crop rows. By way of example only, the distance 102 may be about 304.8 cm (120 inches). However, it should be appreciated that the distance 102 may be greater or less than 304.8 cm (e.g., 203.2 cm, 254 cm, etc.) in certain embodiments. While the illustrated work vehicle 96 includes tracks 98, it should be appreciated that in certain embodiments, the work vehicle may include wheels or a combination of wheels and tracks (e.g., wheels in the front and tracks in the back). In such embodiments, the centerlines of the wheels/tracks on the right side of the work vehicle may be aligned with one another, and the centerlines of the wheels/tracks on the left side of the work vehicle may be aligned with one another.

In the illustrated embodiment, centerlines 104 of the fourth wheels 63 (e.g., extending along the longitudinal axis 101 in the direction of travel 20) are substantially laterally aligned (e.g., substantially aligned along the lateral axis 107) with the centerlines 100 of the tracks 98 of the work vehicle 96. That is, the centerline 104 of the fourth wheel 63 in the left lateral portion 92 of the agricultural implement system 10 is substantially laterally aligned with the centerlines 100 of the tracks 98 on the left side 103 of the work vehicle 96, and the centerline 104 of the fourth wheel 63 in the right lateral portion 94 of the agricultural implement system 10 is substantially laterally aligned with the centerlines 100 of the tracks 98 on the right side 105 of the work vehicle 96. Accordingly, a distance 106 along the lateral axis 107 between the centerlines 104 of the fourth wheels 63 is substantially equal to the distance 102. By way of example only, the distance 106 may be about 304.8 cm (120 inches). However, it should be appreciated that the distance 106 may be greater or less than 304.8 cm (e.g., 203.2 cm, 254 cm, etc.) in certain embodiments. Because the fourth wheels 63 are substantially laterally aligned with the respective tracks 98 (e.g., the centerlines 104 of the fourth wheels 63 are substantially laterally aligned with the centerlines 100 of the respective tracks 98), the fourth wheels 63 may not substantially contribute to soil compaction (e.g., the fourth wheels 63 may not substantially increase compaction of soil that has been compacted by the work vehicle tracks).

As used herein, substantially laterally aligned refers to alignment along the lateral axis 107 (e.g., perpendicular to the direction of travel 20) within a lateral tolerance. Accordingly, two centerlines may be considered substantially laterally aligned if a distance between the centerlines along the lateral axis is less than or equal to the lateral tolerance. In certain embodiments, the lateral tolerance corresponds to the lateral distance (e.g., distance along the lateral axis) between the centerline and a lateral edge of the work vehicle wheel/track. Accordingly, if the centerline of an implement wheel is positioned laterally between the centerline and the lateral edge of the work vehicle wheel/track, the centerlines of the implement wheel and the work vehicle wheel/track may be considered substantially laterally aligned. An implement wheel having a centerline that is substantially laterally aligned with the centerline of the work vehicle wheel/track may be considered an aligned wheel. And, an implement wheel having a centerline that is not substantially laterally aligned with the centerline of the work vehicle wheel/track may be considered an offset wheel. In addition, an actuator configured to move an aligned wheel may be considered an aligned actuator, and an actuator configured to move an offset wheel may be considered of offset actuator.

In the illustrated embodiment, the wheel position control system is configured to instruct the third actuators 66 (e.g., offset actuators) to raise the third wheels 62 (e.g., offset wheels, each having a respective centerline 109 that is not substantially aligned with/laterally offset from the centerline 100 of each work vehicle track 98) off the ground while the toolbar assembly 14 is in the working position. Accordingly, soil compaction beneath the third wheels 62 may be substantially reduced or eliminated. As a result, the crop yield from seeds planted by row units positioned proximate to the third wheels 62 may be increased, thereby enhancing the overall seeding efficiency of the agricultural implement system.

In certain embodiments, the third wheels 62 (e.g., offset wheels) may be positioned laterally outward from the fourth wheels 63 (e.g., aligned wheels). That is, the third wheels 62 may be positioned farther from the centerline 90 of the agricultural implement system 10 along the lateral axis 107 than the fourth wheels 63. By way of example, the distance 102 between the centerlines 100 of the left tracks 98 and the centerlines 100 of the right tracks 98 of the work vehicle 96 may be about 152.4 cm (60 inches). In addition, the distance 106 between the centerlines 104 of the fourth wheels 63 may be about 152.4 cm, such that the centerlines 104 of the fourth wheels 63 are substantially laterally aligned with the centerlines 100 of the respective tracks 98. In addition, centerlines of the third wheels 62 may be separated by a distance greater than 152.4 cm (e.g., 304.8 cm). The wheel position control system is configured to instruct the third actuators 66 (e.g., offset actuators) to raise the third wheels 62, which are positioned laterally outward from the fourth wheels 63, off the ground while the toolbar assembly 14 is in the working position. Accordingly, soil compaction beneath the third wheels 62 may be substantially reduced or eliminated. As a result, the crop yield from seeds planted by row units positioned proximate to the third wheels 62 may be increased, thereby enhancing the overall seeding efficiency of the agricultural implement system.

Figure 3:
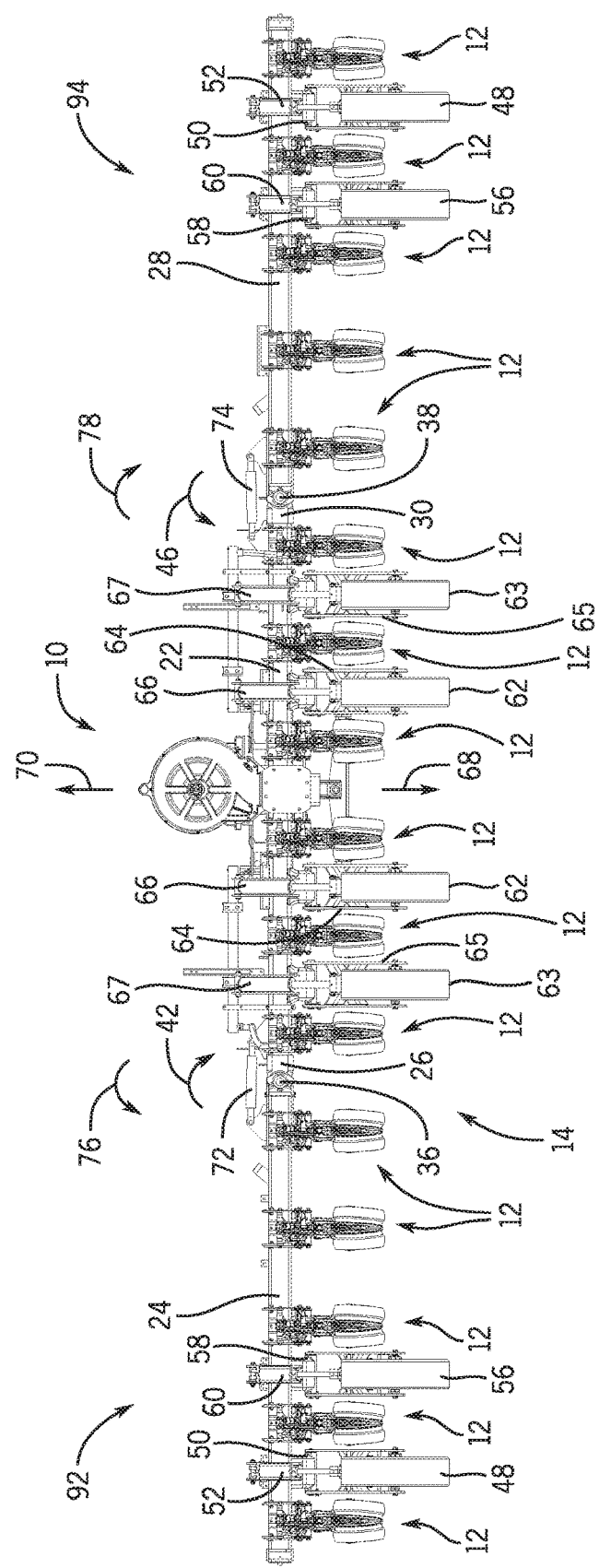
FIG. 3 is a rear view of the agricultural implement system of FIG. 1, in which a toolbar assembly is in a raised/non-working position.

FIG. 3 is a rear view of the agricultural implement system 10 of FIG. 1, in which the toolbar assembly 14 is in the raised/non-working position. With the toolbar assembly 14 in the raised/non-working position, the row units 12 (e.g., ground-engaging elements of the row units, such as gauge wheels, openers, closing discs, packer wheels, etc.) are disengaged from the soil. Disengaging the row units 12 from the soil enables the agricultural implement system 10 to turn at a headland and/or to transition the wing toolbars and the wing supports to the transport position. Furthermore, with the toolbar assembly 14 in the raised/non-working position, the first wheels 48, the second wheels 56, the third wheels 62, and the fourth wheels 63 engage the soil surface, thereby distributing the weight of the agricultural implement system 10 among each of the ground-engaged wheels.

Figure 4:
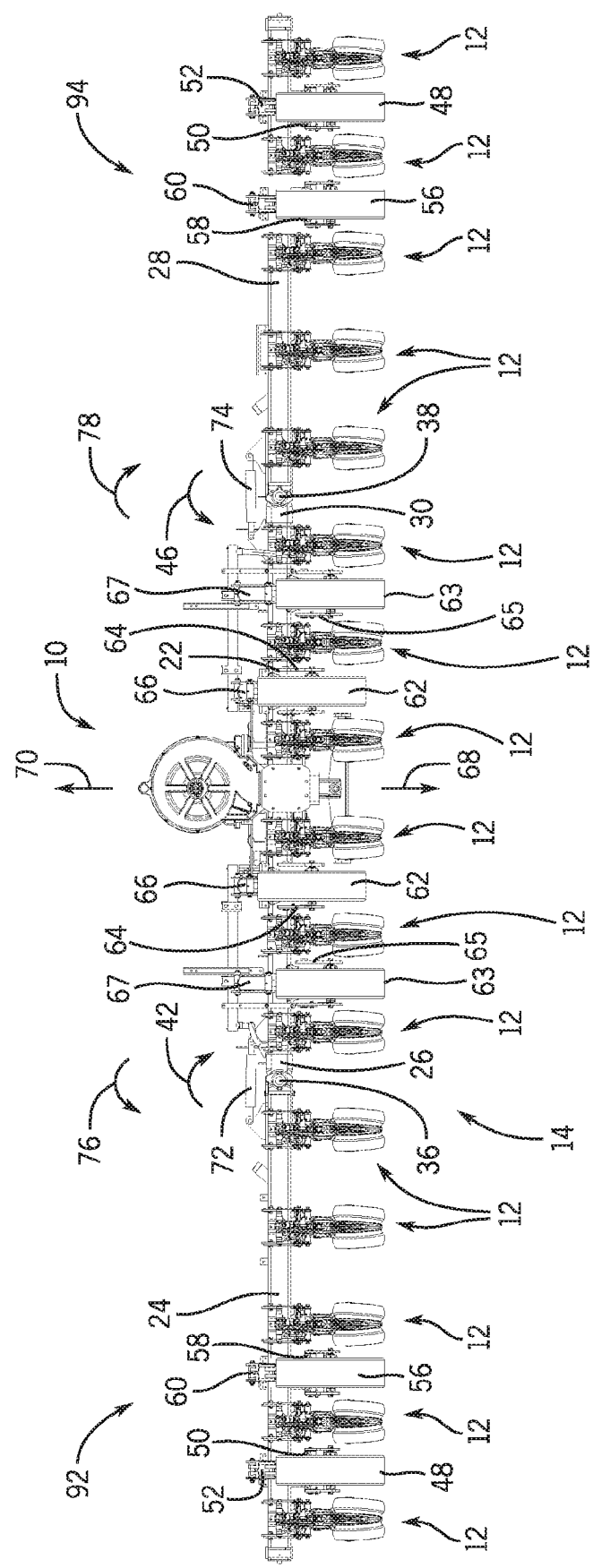
FIG. 4 is a rear view of the agricultural implement system of FIG. 1, in which the toolbar assembly is in a lowered/working position.

FIG. 4 is a rear view of the agricultural implement system 10 of FIG. 1, in which the toolbar assembly 14 is in a lowered/working position. With the toolbar assembly 14 in the lowered/working position, the row units 12 (e.g., ground-engaging elements of the row units, such as gauge wheels, openers, closing discs, packer wheels, etc.) engage the soil, thereby facilitating seeding operations. Furthermore, with the toolbar assembly 14 in the lowered/working position, the first wheels 48, the second wheels 56, and the fourth wheels 63 engage the soil surface. However, as illustrated, the third wheels 62 are raised above the first wheels 48, the second wheels 56, and the fourth wheels 63, such that the third wheels 62 are disengaged from the soil surface. Because the third wheels 62 are disengaged from the soil surface while the toolbar assembly 14 is in the working position, soil compaction beneath the third wheels 62 may be substantially reduced or eliminated. Accordingly, the crop yield from seeds planted by row units proximate to the third wheels 62 (e.g., positioned on opposite sides of each third wheel 62) may be increased. As a result, the overall seeding efficiency of the agricultural implement system may be enhanced. As discussed in detail below, the third wheels 62 may be lowered into engagement with the soil surface while a soil softness exceeds a soil softness threshold value. As a result, the possibility of the first wheels 48, the second wheels 56, the fourth wheels 63, and the row units 12 sinking into soft soil may be substantially reduced.

Figure 5:
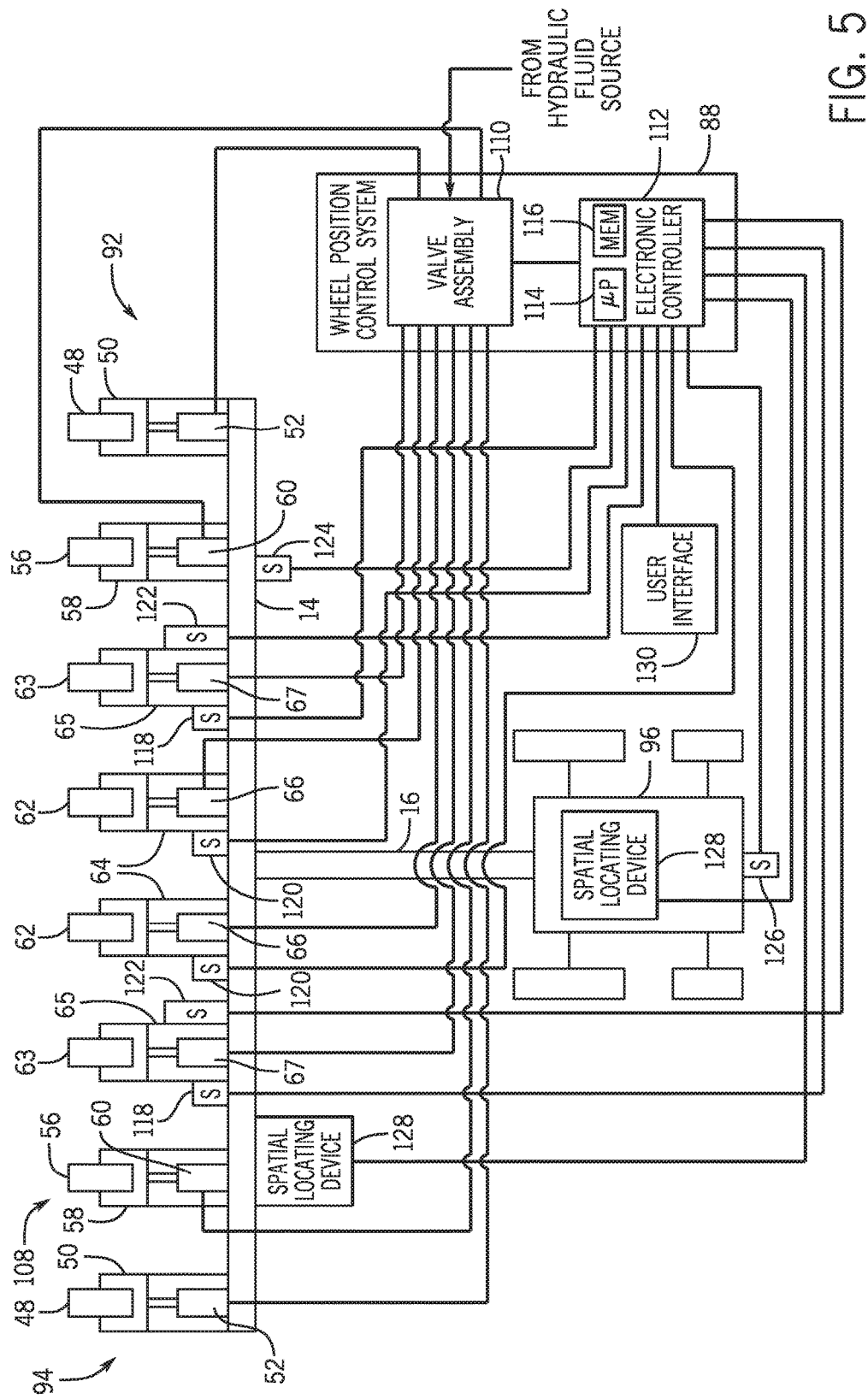
FIG. 5 is a schematic view of a control system that may be employed within the agricultural implement system of FIG. 1.

FIG. 5 is a schematic view of a control system 108 that may be employed within the agricultural implement system of FIG. 1. As illustrated, the control system 108 includes the first wheel actuators 52 (e.g., offset actuators), the second wheel actuators 60 (e.g., offset actuators), the third wheel actuators 66 (e.g., offset actuators), and the fourth wheel actuators 67 (e.g., aligned actuators). As previously discussed, the first wheel actuators 52 are configured to move the first wheels 48 (e.g., offset wheels) relative to the toolbar assembly 14. In addition, the second wheel actuators 60 are configured to move the second wheels 56 (e.g., offset wheels) relative to the toolbar assembly 14. Furthermore, the third wheel actuators 66 are configured to move the third wheels 62 (e.g., offset wheels) relative to the toolbar assembly 14, and the fourth wheel actuators 67 are configured to move the fourth wheels 63 (e.g., aligned wheels) relative to the toolbar assembly 14. While each actuator is a hydraulic cylinder in the illustrated embodiment, it should be appreciated that in alternative embodiments, one or more of the actuators may be a hydraulic motor, a pneumatic cylinder, an electromechanical actuator, or any other suitable type of actuator.

In the illustrated embodiment, each actuator is fluidly coupled to a valve assembly 110 of the wheel position control system 88. The valve assembly 110 is configured to control fluid flow between a hydraulic fluid source and the actuators. However, it should be appreciated that in embodiments in which the actuators are pneumatic actuators, the valve assembly 110 may be configured to control fluid flow between a pneumatic fluid source and the actuators. Furthermore, in embodiments in which the actuators are electromechanical actuators, the valve assembly may be omitted, and the actuators may be control via electronic signals from the wheel position control system.

In the illustrated embodiment, the wheel position control system 88 includes an electronic controller 112 communicatively coupled to the valve assembly 110. The electronic controller 112 includes a processor, such as the illustrated microprocessor 114, and a memory device 116. The electronic controller 112 may also include one or more storage devices and/or other suitable components. The processor 114 may be used to execute software, such as software for controlling the valve assembly 110, and so forth. Moreover, the processor 114 may include multiple microprocessors, one or more "general-purpose" microprocessors, one or more special-purpose microprocessors, and/or one or more application specific integrated circuits (ASICS), or some combination thereof. For example, the processor 114 may include one or more reduced instruction set (RISC) processors.

The memory device 116 may include a volatile memory, such as random access memory (RAM), and/or a nonvolatile memory, such as read-only memory (ROM). The memory device 116 may store a variety of information and may be used for various purposes. For example, the memory device 116 may store processor-executable instructions (e.g., firmware or software) for the processor 114 to execute, such as instructions for controlling the valve assembly 110. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the valve assembly 110, etc.), and any other suitable information.

In the illustrated embodiment, the electronic controller 112 is configured to instruct the wheel actuators 52, 60, 66, and 67 (e.g., via the valve assembly 110) to control the positions of the wheels 48, 56, 62, and 63 relative to the toolbar assembly 14. For example, the electronic controller 112 may instruct the first actuator 52, the second actuator 60, the third actuator 66, and the fourth actuator 67 to lower the first wheels 48, the second wheels 56, the third wheels 62, and the fourth wheels 63, respectively, relative to the toolbar assembly 14 to move the toolbar assembly 14 to the non-working position, in which the first, second, third, and fourth wheels 48, 56, 62, and 63 engage the soil surface, and the row units are disengaged from the soil surface. In addition, the electronic controller 112 may instruct the first, second, third, and fourth actuators 52, 60, 66, and 67 to raise the first, second, third, and fourth wheels 48, 56, 62, and 63 relative to the toolbar assembly 14 to move the toolbar assembly 14 to the working position, in which the first, second, and fourth wheels 48, 56, and 63 engage the soil surface, and the row units engage the soil surface. The electronic controller 112 may also instruct the third actuators 66 to raise the third wheels 62 above the first wheels 48, the second wheels 56, and the fourth wheels 63 while the toolbar assembly 14 is in the working position, such that the third wheels 62 are disengaged from the soil surface. Accordingly, soil compaction beneath the third wheels 62 may be substantially reduced or eliminated, thereby increasing the crop yield from seeds planted by row units proximate to the third wheels 62 (e.g., row units positioned on opposite sides of each third wheel).

In certain embodiments, the electronic controller 112 is configured to selectively instruct the third actuators 66 to lower the third wheels 62 into engagement with the soil surface while the toolbar assembly 14 is in the working position and a soil softness exceeds a soil softness threshold value. As a result, the possibility of the first wheels 48, the second wheels 56, the fourth wheels 63, and the row units 12 sinking into soft soil may be substantially reduced. When the soil softness decreases below the threshold value, the electronic controller 112 may instruct the third actuators 66 to raise the third wheels 62 above the first wheels 48, the second wheels 56, and the fourth wheels 63, thereby disengaging the third wheels 62 from the soil surface.

In the illustrated embodiment, the control system 108 includes two angle sensors 118 (e.g., rotary potentiometers, linear potentiometers, linear variable differential transforms (LVDTs), etc.) communicatively coupled to the electronic controller 112. Each angle sensor 118 is configured to output a signal indicative of an angle of a respective fourth wheel frame 65 relative to the toolbar assembly 14. The electronic controller 112 is configured to receive the signal indicative of the angle from each angle sensor 118 and to determine the soil softness based at least in part on the signal. For example, a larger angle between the fourth wheel frame 65 and the toolbar assembly 14 may indicate that the fourth wheel 63 is sinking into softer soil. Accordingly, the electronic controller 112 may associate a larger angle with softer soil. Conversely, the electronic controller 112 may associate a smaller angle with harder soil. If at least one sensor 118 outputs a signal indicative of an angle greater than a soil softness threshold angle (e.g., stored within the memory device 116), the electronic controller 112 may instruct the third actuators 66 to lower the third wheels 62 into engagement with the soil surface, thereby reducing the penetration depth of the first wheels 48, the second wheels 56, the fourth wheels 63, or a combination thereof, into the soil.

In certain embodiments, the wheel position control system 88 may be configured to independently control each third actuator 66 based at least in part on a respective signal from the angle sensor 118 associated with the adjacent fourth wheel frame 65. For example, if the angle of only one fourth wheel frame 65 (e.g., on the left lateral portion 92 of the agricultural implement system) is greater than the soil softness threshold angle, the electronic controller 112 may instruct only the third actuator 66 coupled to the adjacent third wheel frame 64 (e.g., on the left lateral portion 92 of the agricultural implement system) to lower the third wheel 62 into engagement with the soil surface. As a result, the other third wheel 62 (e.g., on the right lateral portion 94 of the agricultural implement system) may remain in the raised/disengaged position, thereby reducing compaction beneath the raised/disengaged third wheel 62. While an angle sensor 118 is configured to monitor the angle of each fourth wheel frame 65 in the illustrated embodiment, it should be appreciated that in alternative embodiments, a single angle sensor 118 may be configured to monitor the angle of one fourth wheel frame 65. In addition, it should be appreciated that in certain embodiments, one or more angle sensors may be configured to monitor the angle of one or more respective first wheel frames 50 and/or one or more respective second wheel frames 58 (e.g., in addition to the fourth wheel frame angle sensor(s), or as an alternative to the fourth wheel frame angle sensor(s)).

Furthermore, the electronic controller 112 may be configured to instruct the third actuators 66 to control a down force on the third wheels 62 based at least in part on the soil softness while the soil softness exceeds the soil softness threshold value. Accordingly, the third wheels 62 may apply a force to the soil surface sufficient to reduce the possibility of the first wheels 48, the second wheels 56, the fourth wheels 63, and the row units sinking into the soil, while substantially reducing soil compaction beneath the third wheels 62. In certain embodiments, the electronic controller 112 may control the down force on the third wheels 62 based at least in part on feedback from second angle sensors 120. Each second angle sensor 120 is configured to output a signal indicative of an angle of the third wheel frame 64 relative to the toolbar assembly 14. As illustrated, each second angle sensor 120 is communicatively coupled to the electronic controller 112. In certain embodiments, the electronic controller 112 may be configured to adjust the down force applied to the third wheels 62 until the angle of the third wheel frames 64 relative to the toolbar assembly 14 are substantially equal to the angle of the fourth wheel frames 65 relative to the toolbar assembly 14 (e.g., until the difference between the angles is less than a threshold value). Furthermore, the down force applied by each third wheel 62 may be independently controlled (e.g., such that the angle of each third wheel frame 64 is substantially equal to the angle of the adjacent fourth wheel frame 65). In addition, it should be appreciated that in certain embodiments, the control system 108 may include a single second angle sensor 120 coupled to one third wheel frame 64.

In the illustrated embodiment, the control system 108 includes two load sensors 122 communicatively coupled to the electronic controller 112. Each load sensor 122 is configured to output a signal indicative of a load on the respective fourth wheel 63. The electronic controller 112 is configured to receive the signal indicative of the load from each load sensor 122 and to determine the soil softness based at least in part on the signal. For example, a larger force applied to the fourth wheels 63 may indicate that the row units are sinking into softer soil, thereby causing the fourth wheels 63 to support a larger portion of the weight of the toolbar assembly 14. Accordingly, the electronic controller 112 may associate a larger force on the fourth wheels 63 with softer soil. Conversely, the electronic controller 112 may associate a smaller force on the fourth wheels 63 with harder soil. If at least one sensor 122 outputs a signal indicative of a force greater than a soil softness threshold force (e.g., stored within the memory device 116), the electronic controller 112 may instruct the third actuators 66 to lower the third wheels 62 into engagement with the soil surface, thereby reducing the load on the fourth wheels 63. For example, the electronic controller 112 may be configured to adjust the down force applied to the third wheels 62 until the load on the fourth wheels 63 is reduced below the soil softness threshold force.

In certain embodiments, the wheel position control system 88 may be configured to independently control each third actuator 66 based at least in part on a respective signal from the load sensor 122 associated with the adjacent fourth wheel 63. For example, if the load on only one fourth wheel 63 (e.g., on the left lateral portion 92 of the agricultural implement system) is greater than the soil softness threshold load, the electronic controller 112 may instruct only the third actuator 66 coupled to the adjacent third wheel frame 64

(e.g., on the left lateral portion 92 of the agricultural implement system) to lower the respective third wheel 62 into engagement with the soil surface. As a result, the other third wheel 62 (e.g., on the right lateral portion 94 of the agricultural implement system) may remain in the raised/disengaged position, thereby reducing soil compaction beneath the raised/disengaged third wheel 62. While a load sensor 122 is configured to monitor the load on each fourth wheel 63 in the illustrated embodiment, it should be appreciated that in alternative embodiments, a single load sensor 122 may be configured to monitor the load on one fourth wheel 63. In addition, it should be appreciated that in certain embodiments, one or more load sensors may be configured to monitor the load on one or more respective first wheels 48 and/or one or more respective second wheels 56 (e.g., in addition to the fourth wheel load sensor(s), or as an alternative to the fourth wheel load sensor(s)).

In certain embodiments, the electronic controller 112 may be configured to instruct the third actuators 66 to position the third wheels 62 such that the third wheels 62 engage the soil surface while the toolbar assembly 14 is in the lowered/working position and the weight of the agricultural implement system is greater than or equal to a threshold implement weight. For example, the electronic controller 112 may determine the weight of the agricultural implement system based at least in part on the signal(s) output by the load sensor(s) 122 and/or additional load sensor(s) (e.g., a hitch load sensor, etc.). If the weight of the agricultural implement system is greater than or equal to the threshold implement weight and the toolbar assembly 14 is in the lowered/working position, the electronic controller 112 may instruct the third actuators 66 to position the third wheels 62 such that the third wheels 62 engage the soil surface. However, if the weight of the agricultural implement system is less than the threshold implement weight and the toolbar assembly 14 is in the lowered/working position, the electronic controller 112 may instruct the third actuators 66 to raise the third wheels 62 above the soil surface. By way of example, if the agricultural implement system includes a product tank, the weight of the agricultural implement system may be reduced as the product (e.g., seed, fertilizer, etc.) is deposited within the field. Accordingly, when the weight of the agricultural implement system decreases below the threshold implement weight and the toolbar assembly 14 is in the lowered/working position, the electronic controller 112 may instruct the third actuators 66 to raise the third wheels 62 above the soil surface. In addition, while the third wheels 62 are engaged with the soil surface, the electronic controller 112 may instruct the third actuators 66 to control the down force on the third wheels 62 based at least in part on the weight of the agricultural implement system.

As will be appreciated, each load sensor 122 may include any suitable device for monitoring the load on the respective fourth wheel 63. For example, in certain embodiments, the load sensor 122 may include a strain gauge coupled to the fourth wheel frame 65 and configured to monitor the deflection of the fourth wheel frame 65 under a load. In further embodiments, the load sensor 122 may include a load cell (e.g., piezoelectric load cell, etc.) disposed between the fourth wheel 63 and the fourth wheel frame 65, and configured to directly monitor the load on the fourth wheel 63. In certain embodiments, the electronic controller 112 may also be configured to instruct the third actuators 66 to lower the third wheels 62 into engagement with the soil surface if the force applied to the fourth wheels 63 exceeds a second threshold value indicative of a maximum desired load on the fourth wheel frames 65. In further embodiments, one or more strain gauges may be coupled to the toolbar assembly and configured to monitor a bending load on the toolbar assembly. In such embodiments, the electronic controller may be configured to instruct the third actuators to lower the third wheels into engagement with the soil surface if the bending load exceeds a threshold value indicative of a maximum desired bending load on the toolbar assembly.

In certain embodiments, the control system 108 includes a first soil sensor 124 mounted on the agricultural implement system (e.g., on the toolbar assembly 14, on the tow bar assembly 16, etc.) and configured to output a signal indicative of the soil softness. Furthermore, in certain embodiments, the control system 108 includes a second soil sensor 126 mounted to the work vehicle 96 and configured to output a signal indicative of the soil softness. The electronic controller 112 is configured to receive the signals from the soil sensors 124 and 126, and to instruct the third actuators 66 to lower the third wheels 62 into engagement with the soil surface if the soil softness is greater than a soil softness threshold value (e.g., stored within the memory device 116). The electronic controller 112 may also be configured to instruct the third actuators 66 to control a down force on the third wheels 62 based at least in part on the soil softness while the soil softness exceeds the soil softness threshold value.

As will be appreciated, each soil sensor may include any suitable type of sensor configured to output a signal indicative of soil softness. For example, the soil sensor may include a contact sensor configured to engage the soil and to monitor a load applied to the sensor. In addition, the soil sensor may include a non-contact sensor, such as an acoustic analyzer, an optical analyzer, an electromagnetic analyzer, or a combination thereof. For example, the non-contact sensor (e.g., acoustic analyzer, optical analyzer, electromagnetic analyzer, etc.) may send and/or receive energy from the agricultural field to measure certain properties of the soil, such as water/moisture content, soil profile, soil type, or a combination thereof, among other soil properties. For example, soil with a higher water/moisture content may be softer than soil with a lower water/moisture content. Accordingly, the non-contact sensor may output a signal indicative of soil softness. In further embodiments, other suitable types of sensor (e.g., chemical analyzers, soil penetrometers, etc.) may be utilized. Furthermore, it should be appreciated that the control system 108 may include more or fewer soil sensors (e.g., 1, 2, 3, 4, 5, 6, or more). For example, in certain embodiments, the first soil sensor 124 or the second soil sensor 126 may be omitted.

In certain embodiments, the electronic controller 112 is configured to determine the soil softness based at least in part on a position of the agricultural implement system and a field condition map (e.g., stored within the memory device 116). For example, in the illustrated embodiment, the control system 108 includes a first spatial locating device 128 (e.g., global positioning system (GPS) receiver) coupled to the agricultural implement system (e.g., to the toolbar assembly 14, to the tow bar assembly 16, etc.) and a second spatial locating device 128 coupled to the work vehicle 96. However, it should be appreciated that in alternative embodiments, the control system may have more or fewer spatial locating devices (e.g., only one spatial locating device coupled to the agricultural implement system, only one spatial locating device coupled to the work vehicle, etc.). The field condition map may include two-dimensional data that maps a location within the field to soil softness (e.g., measured by one or more soil sensors during a previous pass through the field). The electronic controller 112 may determine the soil softness by locating the position of the agricultural implement system (e.g., as determined by the spatial locating devices 128) on the soil condition map and receiving the soil softness at that location. If the soil softness is greater than the soil softness threshold value, the electronic controller 112 may instruct the third actuators 66 to lower the third wheels 62 into engagement with the soil surface. The electronic controller 112 may also be configured to instruct the third actuators 66 to control a down force on the third wheels 62 based at least in part on the soil softness while the soil softness exceeds the soil softness threshold value. While the illustrated embodiment includes angle sensors 118 and 120, load sensors 122, soil sensors 124 and 126, and spatial locating devices 128, it should be appreciated that in alternative embodiments, one or more of these elements may be omitted.

In the illustrated embodiment, the control system 108 includes a user interface 130 (e.g., located within a cab of the work vehicle 96) communicatively coupled to the electronic controller 112. The user interface 130 may enable a user to provide manual inputs to the electronic controller 112. For example, in certain embodiments, the electronic controller 112 may selectively instruct the third actuators 66 to lower the third wheels 62 into engagement with the soil surface in response to a manual input from the user interface 130. In addition, the electronic controller 112 may instruct the third actuators 66 to control the down force on the third wheels 62 based at least in part on a manual input from the user interface 130. In certain embodiments, the electronic controller may selectively instruct the third actuators to lower the third wheels into engagement with the soil and/or control the down force on the third wheels based at least in part on input from a work vehicle controller (e.g., which may be communicatively coupled to the electronic controller of the wheel position control system via a communication link, such as a controller area network (CAN) bus or an ISO-BUS).

In certain embodiments, while the toolbar assembly is in the lowered/working position, the electronic controller may instruct the second actuators to raise the second wheels above the first wheels (e.g., via rotation of the second wheel frames) such that the second wheels are disengaged from the soil surface. Accordingly, with the toolbar assembly in the lowered/working position, the row units, the first wheels, and the fourth wheels engage the soil surface. Alternatively, the electronic controller may instruct the first actuators to raise the first wheels above the second wheels (e.g., via rotation of the first wheel frames) such that the first wheels are disengaged from the soil surface. Accordingly, with the toolbar assembly in the lowered/working position, the row units, the second wheels, and the fourth wheels engage the soil surface. As a result of raising the first wheels or the second wheels above the soil surface, soil compaction on both lateral sides of each row unit positioned between a pair of adjacent first and second wheels, a condition which may be known as a pinch row, may be substantially reduced or eliminated. Therefore, the crop yield from the seeds planted by such row units may be increased, and the overall seeding efficiency of the agricultural implement system may be enhanced.

Furthermore, the electronic controller may instruct any combination of offset actuators to raise the corresponding offset wheels such that the offset wheels are disengaged from the soil surface. For example, in certain embodiments, the electronic controller may instruct at least one first actuator, at least one second actuator, at least one third actuator, or a combination thereof, to raise the corresponding wheels such that the corresponding wheels are disengaged from the soil surface. In addition, the electronic controller may be configured to selectively instruct the offset actuators of the raised wheels to lower the raised wheels into engagement with the soil surface while the toolbar assembly is in the lowered/working position and a soil softness exceeds a soil softness threshold value.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural implement system, comprising:
 a toolbar assembly configured to support at least one row unit;
 a plurality of wheels configured to support the toolbar assembly above a soil surface, wherein the plurality of wheels comprises an aligned wheel and an offset wheel, a centerline of the aligned wheel is configured to be substantially laterally aligned with a centerline of a corresponding wheel or track of a tow vehicle, a centerline of the offset wheel is configured to be laterally offset from the centerline of the corresponding wheel or track of the tow vehicle, and the tow vehicle is configured to tow the agricultural implement system; and
 a wheel position control system configured to control movement of each wheel of the plurality of wheels relative to the toolbar assembly, wherein the wheel position control system is configured to instruct an aligned actuator and an offset actuator to lower the aligned wheel and the offset wheel, respectively, relative to the toolbar assembly to transition the toolbar assembly to a non-working position, in which the aligned and offset wheels engage the soil surface and the at least one row unit is disengaged from the soil surface, the wheel position control system is configured to instruct the aligned actuator and the offset actuator to raise the aligned wheel and the offset wheel, respectively, relative to the toolbar assembly to transition the toolbar assembly to a working position, in which the aligned wheel engages the soil surface and the at least one row unit engages the soil surface, and the wheel position control system is configured to instruct the offset actuator to raise the offset wheel above the aligned wheel relative to the toolbar assembly while the toolbar assembly is in the working position such that the offset wheel is disengaged from the soil surface.

2. The agricultural implement system of claim 1, wherein the wheel position control system is configured to selectively instruct the offset actuator to lower the offset wheel into engagement with the soil surface while the toolbar assembly is in the working position and a soil softness exceeds a soil softness threshold value.

3. The agricultural implement system of claim 2, comprising an angle sensor configured to output a signal indicative of an angle of an aligned wheel frame relative to the toolbar assembly, wherein the aligned wheel frame is rotatable relative to the toolbar assembly and configured to support the aligned wheel, and the wheel position control system is configured to determine the soil softness based at least in part on the signal.

4. The agricultural implement system of claim 2, comprising a load sensor configured to output a signal indicative of a load on the aligned wheel, wherein the wheel position control system is configured to determine the soil softness based at least in part on the signal.

5. The agricultural implement system of claim 2, comprising a soil sensor configured to output a signal indicative of the soil softness to the wheel position control system.

6. The agricultural implement system of claim 2, wherein the wheel position control system is configured to determine the soil softness based at least in part on a position of the agricultural implement system and a field condition map.

7. The agricultural implement system of claim 2, wherein the wheel position control system is configured to instruct the offset actuator to control a down force on the offset wheel based at least in part on the soil softness while the soil softness exceeds the soil softness threshold value.

8. The agricultural implement system of claim 1, wherein the offset wheel is positioned closer to a centerline of the agricultural implement system than the aligned wheel, and the centerline of the agricultural implement system extends along a direction of travel of the agricultural implement system between left and right lateral portions of the agricultural implement system.

9. The agricultural implement system of claim 1, wherein the wheel position control system is configured to selectively instruct the offset actuator to lower the offset wheel while the toolbar assembly is in the working position in response to a manual input.

10. The agricultural implement system of claim 1, comprising a tow bar assembly configured to be coupled to the tow vehicle via a hitch assembly;
wherein the toolbar assembly comprises a central toolbar rigidly coupled to the tow bar assembly, and at least one wing toolbar rotatable relative to the tow bar assembly, and wherein the aligned wheel and the offset wheel are coupled to the central toolbar by respective wheel frames.

11. An agricultural implement system, comprising:
a wheel position control system configured to control respective positions of an aligned wheel and an offset wheel of the agricultural implement system, wherein a centerline of the aligned wheel is configured to be substantially laterally aligned with a centerline of a corresponding wheel or track of a tow vehicle, a centerline of the offset wheel is configured to be laterally offset from the centerline of the corresponding wheel or track of the tow vehicle, the aligned and offset wheels are configured to support a toolbar assembly, the toolbar assembly is configured to support at least one row unit, and the tow vehicle is configured to tow the agricultural implement system;
wherein the wheel position control system comprises an electronic controller having a processor and a memory, the electronic controller is configured to instruct an aligned actuator and an offset actuator to lower the aligned wheel and the offset wheel, respectively, to transition the toolbar assembly to a non-working position, in which the aligned and offset wheels engage a soil surface and the at least one row unit is disengaged from the soil surface, the electronic controller is configured to instruct the aligned and offset actuators to raise the aligned and offset wheels, respectively, to transition the toolbar assembly to a working position, in which the aligned wheel engages the soil surface and the at least one row unit engages the soil surface, and the electronic controller is configured to instruct the offset actuator to raise the offset wheel above the aligned wheel while the toolbar assembly is in the working position such that the offset wheel is disengaged from the soil surface; and
wherein the electronic controller is configured to instruct the offset actuator to lower the offset wheel into engagement with the soil surface while the toolbar assembly is in the working position and a soil softness exceeds a soil softness threshold value.

12. The agricultural implement system of claim 11, wherein the electronic controller is configured to receive a signal indicative of the soil softness.

13. The agricultural implement system of claim 12, wherein the aligned wheel frame is rotatable relative to the toolbar assembly and configured to support the aligned wheel; and
wherein the signal indicative of the soil softness is received from an angle sensor configured to monitor an angle of an aligned wheel frame relative to the toolbar assembly, from a load sensor configured to monitor a load on the aligned wheel, from a soil sensor, or a combination thereof.

14. The agricultural implement system of claim 11, wherein the electronic controller is configured to instruct the offset actuator to control a down force on the offset wheel based at least in part on the soil softness while the soil softness exceeds the soil softness threshold value.

15. The agricultural implement system of claim 11, wherein the electronic controller is configured to determine the soil softness based at least in part on a position of the agricultural implement system and a field condition map.

16. An agricultural implement system, comprising:
a toolbar assembly configured to support at least one row unit;
an aligned wheel configured to support the toolbar assembly above a soil surface;
an aligned wheel frame rotatably coupled to the toolbar assembly and configured to support the aligned wheel, wherein the aligned wheel frame is positioned to laterally align a centerline of the aligned wheel with a centerline of a corresponding wheel or track of a tow vehicle while the tow vehicle is coupled to the agricultural implement system, and wherein the tow vehicle is configured to tow the agricultural implement system;
an aligned actuator configured to adjust a first angle of the aligned wheel frame relative to the toolbar assembly;
an offset wheel configured to support the toolbar assembly above the soil surface;
an offset wheel frame rotatably coupled to the toolbar assembly and configured to support the offset wheel, wherein the offset wheel frame is positioned to laterally offset a centerline of the offset wheel from the centerline of the corresponding wheel or track of the tow vehicle while the tow vehicle is coupled to the agricultural implement system;
an offset actuator configured to adjust a second angle of the offset wheel frame relative to the toolbar assembly; and
a wheel position control system comprising an electronic controller, wherein the electronic controller is configured to instruct the aligned actuator and the offset actuator to lower the aligned wheel and the offset wheel, respectively, relative to the toolbar assembly to transition the toolbar assembly to a non-working position, in which the aligned and offset wheels engage the soil surface and the at least one row unit is disengaged from the soil surface, the electronic controller is configured to instruct the aligned and offset actuators to raise the aligned and offset wheels, respectively, relative to the toolbar assembly to transition the toolbar assembly to a working position, in which the aligned wheel engages the soil surface and the at least one row unit engages the soil surface, and the electronic controller is configured to instruct the offset actuator to raise the offset wheel above the aligned wheel while the toolbar assembly is in the working position such that the offset wheel is disengaged from the soil surface.

17. The agricultural implement system of claim 16, comprising a sensor communicatively coupled to the electronic controller, wherein the sensor is configured to output a signal indicative of a soil softness, and the electronic controller is configured to instruct the offset actuator to lower the offset wheel into engagement with the soil surface while the toolbar assembly is in the working position and the soil softness exceeds a soil softness threshold value.

18. The agricultural implement system of claim 16, wherein the offset wheel frame is positioned closer to a centerline of the agricultural implement system than the aligned wheel frame, and the centerline extends along a direction of travel of the agricultural implement system between left and right lateral portions of the agricultural implement system.

19. The agricultural implement system of claim 16, comprising a user interface communicatively coupled to the electronic controller, wherein the electronic controller is configured to selectively lower the offset wheel in response to a manual input from the user interface while the toolbar assembly is in the working position.

20. The agricultural implement system of claim 16, comprising a tow bar assembly configured to be coupled to the tow vehicle via a hitch assembly;

wherein the toolbar assembly comprises a central toolbar rigidly coupled to the tow bar assembly, and at least one wing toolbar rotatable relative to the tow bar assembly, and wherein the aligned wheel frame and the offset wheel frame are coupled to the central toolbar.

\* \* \* \* \*